(12) United States Patent
Matsuoka et al.

(10) Patent No.: US 7,781,091 B2
(45) Date of Patent: Aug. 24, 2010

(54) BATTERY PACK HAVING ELASTIC BODY INSERTED BETWEEN MEMBERS FOR HOLDING CELL MODULES AND FRAME OF BATTERY PACK

(75) Inventors: Toshiyuki Matsuoka, Wako (JP); Atsushi Mizutani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1108 days.

(21) Appl. No.: 11/450,282

(22) Filed: Jun. 12, 2006

(65) Prior Publication Data

US 2006/0286441 A1 Dec. 21, 2006

(30) Foreign Application Priority Data

Jun. 16, 2005 (JP) ............................... 2005-176227

(51) Int. Cl.
*H01M 2/10* (2006.01)
(52) U.S. Cl. ........................... 429/99; 429/100; 429/97
(58) Field of Classification Search .................. 429/97, 429/99
See application file for complete search history.

(56) References Cited

U.S. PATENT DOCUMENTS

2005/0153199 A1* 7/2005 Yagi et al. ................... 429/148

FOREIGN PATENT DOCUMENTS

| CN | 2689465 Y | 3/2005 |
| JP | 2003-308816 A | 10/2003 |
| JP | 2003308816 A * | 10/2003 |

OTHER PUBLICATIONS

Chinese Office Action dated Jan. 16, 2009, issued in corresponding Chinese Patent Application No. 200610092507.

* cited by examiner

*Primary Examiner*—Dah-Wei D Yuan
*Assistant Examiner*—Zachary Best
(74) *Attorney, Agent, or Firm*—Westerman, Hattori, Daniels & Adrian, LLP (57) ABSTRACT

A battery pack includes a plurality of cylindrical cell modules, each formed by serially connecting a plurality of unit cells; a cell box in which the cell modules are contained in a manner such that the cell modules are arranged parallel to each other; a plurality of holding members fit to outer peripheries of the cell modules so as to arrange the cell modules in a zigzag manner along axes of the cell modules, in a manner such that the holding members make contact with each other and a gap is secured between every adjacent cell module; and an elastic body inserted between the holding members and a frame of the cell box. Preferably, a pushing member provided between the elastic body and the holding members is provided.

2 Claims, 9 Drawing Sheets

BATTERY PACK HAVING ELASTIC BODY INSERTED BETWEEN MEMBERS FOR HOLDING CELL MODULES AND FRAME OF BATTERY PACK

BACKGROUND OF THE INVENTION

1. Field of the Invention

The present invention relates to a battery pack formed by arranging and containing a plurality of cell modules in parallel to each other in a cell box.

Priority is claimed on Japanese Patent Application No. 2005-176227, filed Jun. 16, 2005, the content of which is incorporated herein by reference.

2. Description of the Related Art

A battery pack may be formed by stacking cylindrical cell modules in a cell box in a zigzag form, where each cell module is formed by serially connecting a plurality of unit cells (see Reference Document 1: Japanese Unexamined Patent Application, First Publication No. 2003-308816). In the battery pack disclosed in Reference Document 1, holding members, each having a polygonal section, are attached to the outer periphery of each cell module at specific intervals along the axis of the cell module, and a plurality of the cell modules are stacked in a zigzag in a manner such that corresponding outer faces of the holding members of adjacent cell modules contact each other.

When the cell modules are stacked in a manner such that corresponding outer faces of the holding members of adjacent cell modules contact each other, heights of upper ends of the cell modules in the top row may not be uniform due to an error in dimension between the holding members, or the like. If the cell modules, arranged in a zigzag while having such an error, are contained in a cell box, the cell modules are unstable in the cell box.

In particular, when such a cell box is installed in a vehicle, the cell modules may be shaken due to the movement of the vehicle, which may cause unnecessary noise.

SUMMARY OF THE INVENTION

In light of the above circumstances, an object of the present invention is to provide a battery pack for avoiding an unstable state of the cell modules in a cell box.

Therefore, the present invention provides a battery pack (e.g., a battery pack 1 in embodiments explained later) comprising:

a plurality of cylindrical cell modules (e.g., cell modules 10 in the embodiments), each formed by serially connecting a plurality of unit cells;

a cell box (e.g., a cell box 100 in the embodiments) in which the cell modules are contained in a manner such that the cell modules are arranged parallel to each other;

a plurality of holding members (e.g., grommets 50 in the embodiments) fit to outer peripheries of the cell modules so as to arrange the cell modules in a zigzag manner along axes of the cell modules, in a manner such that the holding members make contact with each other and a gap is secured between every adjacent cell module; and an elastic body (e.g., an elastic body 150A or 150B in the embodiments) inserted between the holding members and a frame (e.g., an upper frame 130 in the embodiment) of the cell box.

In accordance with the above structure, a dimensional error due to stacking the cell modules can be canceled by compression of the elastic body, thereby pushing and holding the cell modules in the cell box by the elastic body. As a result, it is possible to avoid an unstable state of the cell modules in the cell box, and unnecessary noise due to the unstable state.

The battery may further comprise:

a pushing member (e.g., a pushing member 140A in an embodiment explained later) provided between the elastic body and the holding members, wherein:

a fittable protrusion (e.g., a fittable protrusion 147 in the embodiment) is provided on one of the elastic body and the pushing member, and a fittable hole (e.g., a fittable hole 151 in the embodiment) is provided on the other of the elastic body and the pushing member; and the fittable protrusion is fit to the fittable hole so that the elastic body and the pushing member are joined together to form a single body.

In accordance with the above structure, it is possible to substantially uniformly apply force via the pushing member to the cell modules.

The elastic body (e.g., an elastic body 150B in an embodiment explained later) may be made using a metal plate spring, and have hooks (e.g., hooks 156 in the embodiment) between which a part of the frame is positioned, which push the part of the frame. In accordance with the above structure, it is possible to easily fasten the elastic body to the frame by pushing the frame using the hooks between which a part of the frame is positioned.

In this case, in a typical example, the elastic body has a substantially U-shaped section consisting of a horizontal portion and standing walls extending upward from both ends of the horizontal portion along a width thereof;

holes are formed in both corner portions between the horizontal portion and the standing walls; and slits for connecting the holes at both corner portions are formed in the horizontal portion.

DETAILED DESCRIPTION OF THE INVENTION

Hereinafter, embodiments of the battery pack in accordance with the present invention will be described with reference to the appended FIGS. 1 to 9.

First Embodiment

A first embodiment of the battery pack of the present invention will be explained with reference to FIGS. 1 to 7. A battery pack 1 of the present embodiment is attached to a back face of a seat in an electric vehicle.

Figure 1:
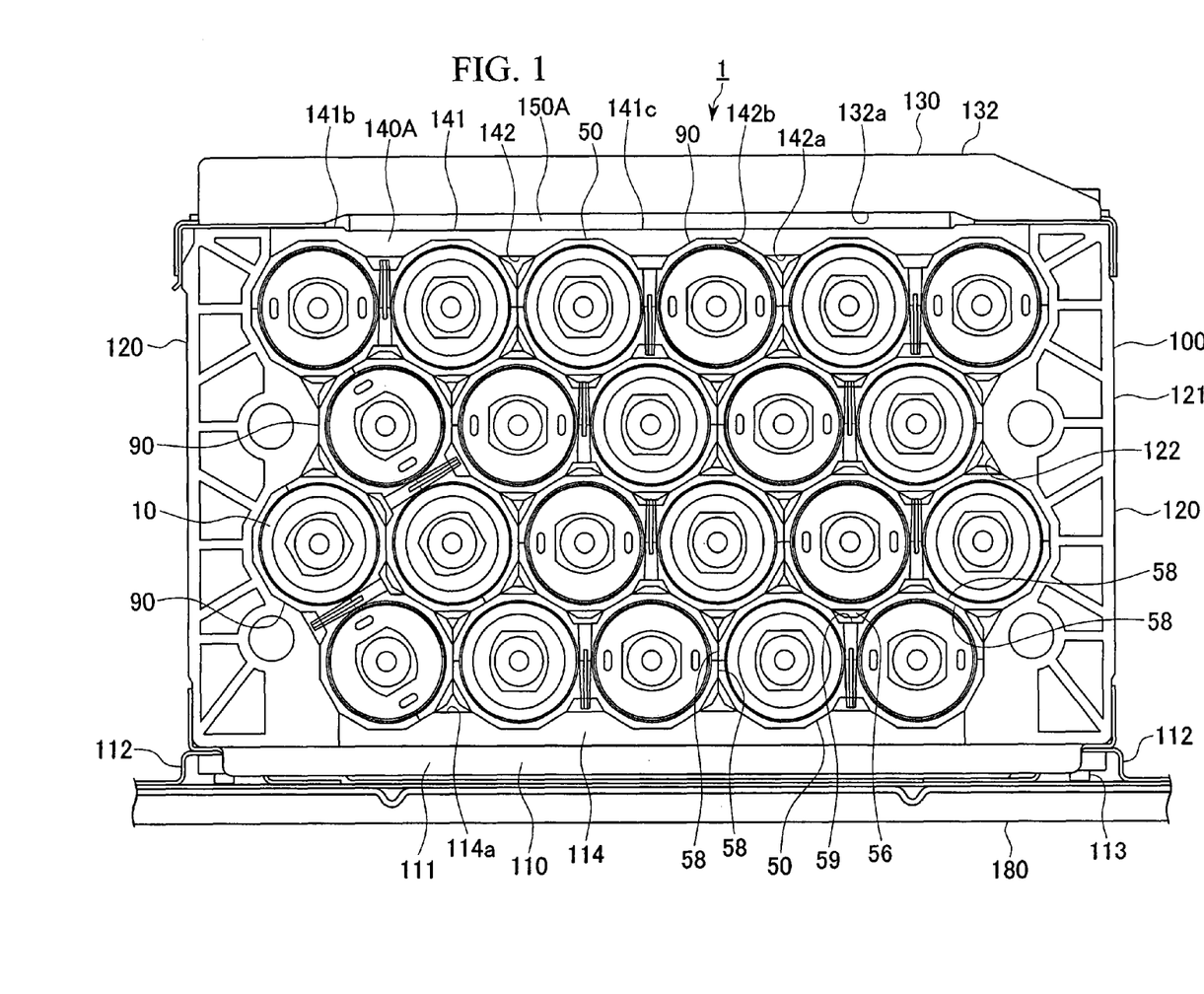
FIG. 1 is a front view of a battery pack as a first embodiment in accordance with the present invention.
Figure 5:
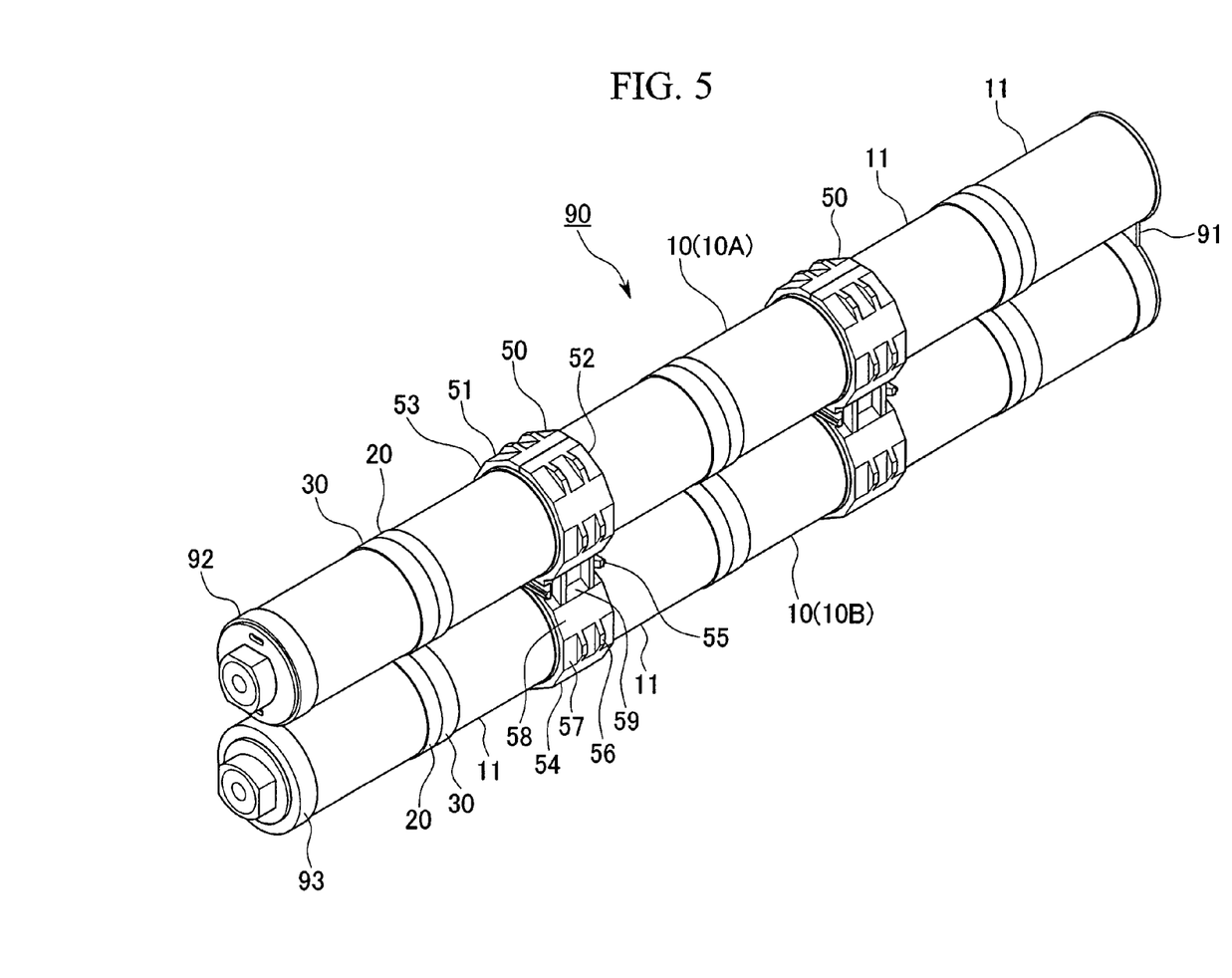
FIG. 5 is a perspective view showing a cell module unit in the first embodiment.

FIG. 1 is a general front view of the battery pack 1 having a cell box 100 in which a plurality of cell modules 10 (22 modules in the present embodiment) are contained in a manner such that the axes of the cell modules 10 are parallel to each other. As shown in FIG. 5, in this battery pack 1, pairs of cell modules 10 are respectively bound together in advance by using grommets 50 (i.e., holding members), so as to form cell module units 90. A plurality of the cell module units 90 are stacked in a manner such that outer faces of the grommets 50 of adjacent cell module units 90 contact each other, and thereby the cell modules 10 are arranged in a manner such that the axes of the cell modules 10 are parallel to each other. Accordingly, a specific gap is produced between the adjacent cell modules 10, and the cell modules 10 are arranged in a zigzag, observed along the axes thereof. In this battery pack 1, all cell modules 10 (i.e., 22 cell modules) are serially connected.

First, the cell modules 10 and the cell module unit 90 will be explained with reference to FIG. 5. Note that when the cell module unit 90 is explained with reference to FIG. 5, two cell modules 10 are distinguished from each other by assigning different names (i.e., cell modules 10A and 10B) to the two cell modules 10.

The cell module 10A or 10B includes a plurality of cylindrical unit cells 11 (six unit cells in the example shown) which are serially and linearly connected to each other. Among the unit cells 11, two adjacent unit cells 11 are electrically and mechanically connected to each other via a connection ring 20. An insulation ring 30 is attached between the connection ring 20 and one of the unit cells 11 connected using this connection ring 20.

Two cell modules 10A and 10B are arranged in a manner such that the directions of the electrodes of both cell modules are opposite to each other. The positive electrode of the cell module 10A (on the right end side in FIG. 5) and the negative electrode of the cell module 10B (also on the right end side in FIG. 5) are electrically connected and mechanically coupled to each other by using a bus bar 91. A negative-electrode socket 92 is attached to the negative electrode (on the left end side in FIG. 5) of the cell module 10A while a positive-electrode socket 93 is attached to the positive electrode (also on the left end side in FIG. 5) of the cell module 10B.

The cell modules 10A and 10B are coupled with each other while securing a predetermined gap therebetween and arranging the axes of both being parallel to each other, by using two grommets 50 hung over both cell modules 10A and 10B in the middle of the axes of the cell modules.

The grommet 50 is attached to every second position where the connection ring 20 and the insulation 30 are provided, and fit to both the connection ring 20 and the insulation 30 so as to surround them.

Each grommet 50 is made of hard resin and consists of two holding bodies 51 and 52 obtained by dividing the grommet 50 into two portions (i.e., the holding bodies 51 and 52) along a diametral line. When each of the holding bodies 51 and 52 is fit over the cell modules 10A and 10B, and the holding bodies 51 and 52 are coupled by fitting a fittable member 55 provided at one of the holding bodies 51 and 52 (here, the holding body 51) to the other holding body (here, the holding body 52), two circular holding portions 53 and 54 are formed, which respectively fit to outer peripheries of the cell modules 10A and 10B. Each of the holding portions 53 and 54 has a polygonal section perpendicular to the axis of the grommet 50, and the outer-peripheral face of each of the holding portions 53 and 54 consists of protruding faces 57, each having fins 56, and flat faces 58, each having no fins, which are alternately provided. In addition, a recessed portion 59, to which the fins 56 can be inserted, is formed at a link portion between the holding portions 53 and 54.

When the cell module units 90 are arranged in a zigzag form in the cell box 100, the flat faces 58 of the grommets 50 of two adjacent cell module units 90 contact with each other. In addition, regarding two grommets 50 stacked vertically, the fins 56 of one of the grommets are inserted into the recessed portion 59 of the other grommet 50. In accordance with the engagement between the fins 56 and the recessed portion 59, the cell module units 90 are positioned with respect to each other.

In the arrangement of the cell module units 90 shown in FIG. 1, the cell module 10 positioned at the left-most position in the bottom row, and the cell module 10 positioned at the left-most position in the second row from the bottom, form one cell module unit 90. On the other hand, the cell module 10 positioned second from the left in the second row from the bottom, and the cell module 10 positioned at the left-most position in the third row from the bottom, form one cell module unit 90. Regarding all the other cell modules 10, two horizontally-adjacent cell modules 10 form one cell module unit 90. However, this arrangement shown in FIG. 1 is only an example, and the present invention is not limited to such an arrangement.

Though it is not shown in FIG. 5, both ends of the cell modules 10A and 10B along the axes thereof are coupled with each other by a bus-bar cover 94 (refer to FIG. 2) which covers the bus bar 91, and a cap 95 (also refer to FIG. 2) which covers the sockets 92 and 93. Each of the bus-bar cover 94 and the cap 95 has a polygonal section perpendicular to the axes of the cell modules 10A and 10B, similar to the polygonal section of the grommet 50, but has no fins or recessed portion.

Figure 2:
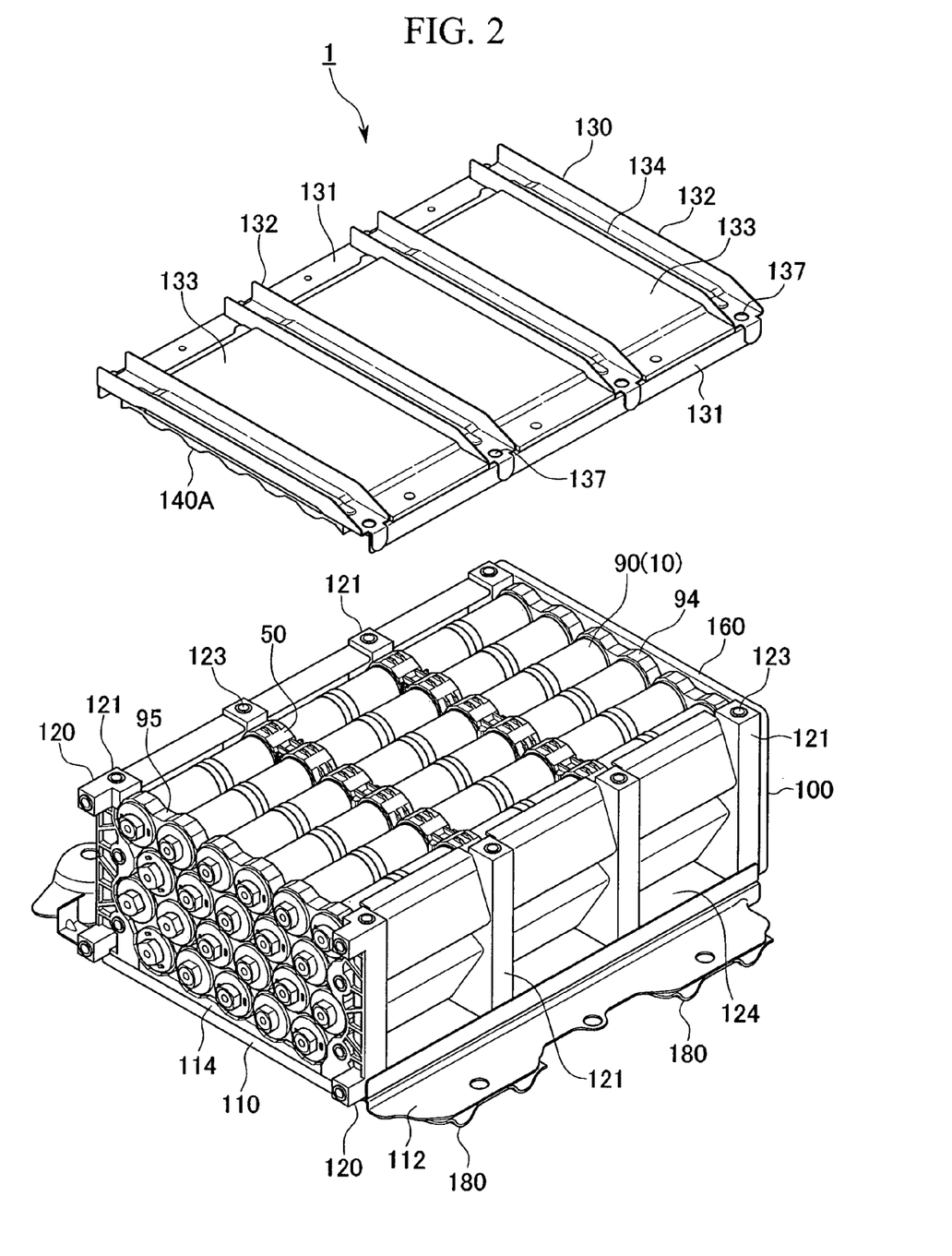
FIG. 2 is an exploded perspective view of the battery pack of the first embodiment.

Next, the cell box 100 will be explained with reference to FIGS. 1 to 4, 6, and 7. As shown in FIGS. 1 and 2, the cell box 100 has a lower frame 110, a pair of side frames 120, an upper frame 130, and an end plate 160. The cell box 100 is assembled by (i) forming a U-shaped frame body by fastening the pair of the side frames 120 on both ends of the lower frame 110 in a manner such that the side frames 120 stand on the lower frame 110 so as to face each other, (ii) arranging the cell module units 90 inside this frame body, and (iii) fastening the upper frame 130 and the end plate 160 to the side frames 120.

The lower frame 110 has a bottom plate 111 and two sub frames 112 which are provided below the bottom plate 111, extend along the side frames 120, and are fastened to the side frames 120 together with the bottom plate 111 by using bolts 113.

The bottom plate 111 has a reception member 114 for accepting the grommets 50, the bus-bar covers 94, and the caps 95 of the cell module units 90 arranged in the bottom row, where the reception member 114 is provided at an area where these accepted members are arranged. An upper surface 114a of the reception member 114 has a waved shape in conformity with the outer-peripheral faces of the relevant grommets 50, bus-bar covers 94, and caps 95. Therefore, when the grommets 50, the bus-bar covers 94, and the caps 95 of the cell module units 90 are laid on the reception member 114, they fit tightly in recessed portions of the upper surface 114a.

The side frames 120 are members for holding the grommets 50, the bus-bar covers 94, and the caps 95 of the cell module units 90 which are arranged at the outermost sides in the cell box 100. In order to arrange these grommets 50, bus-bar covers 94, and caps 95, each side frame 120 has holding portions 121, each having an inner face 122 which has a specific polygonal shape. When the cell module units 90 are stacked so as to arrange the cell modules 10 in a zigzag, this inner face 122 having the polygonal shape contacts the outermost grommets 50, bus-bar covers 94, and caps 95. In addition, threaded holes 123 are formed in each of upper and lower faces of each holding portion 121, so as to attach the lower frame 110 and the upper frame 130. Between adjacent holding portions 121, an opening 124 for distributing cooling air is formed. Accordingly, cooling air is drawn from the openings 124 of one of the side frames 120, flows through gaps between the cell modules 10, and is discharged from the openings 124 of the other side frame 120.

The upper frame 130 consists of (i) two main frames 131 respectively extending along the upper sides of the side frames 120, (ii) four cross members 132 for coupling the main frames 131, wherein the cross members 132 are arranged on the bus-bar covers 94, and the caps 95 of the cell module units 90 arranged in the top row, and (iii) three closing plates 133 for closing openings between the cross members 132. Each cross member 132 is welded to upper faces of the main frames 131. Each closing plate 133 fits between adjacent cross members 132 and is fastened to the main frames 131 using clips. At each portion where the main frame 131 and the cross member 131 overlap with each other, an upper-frame fastening hole 137, which is a through hole, is formed.

Figure 3:
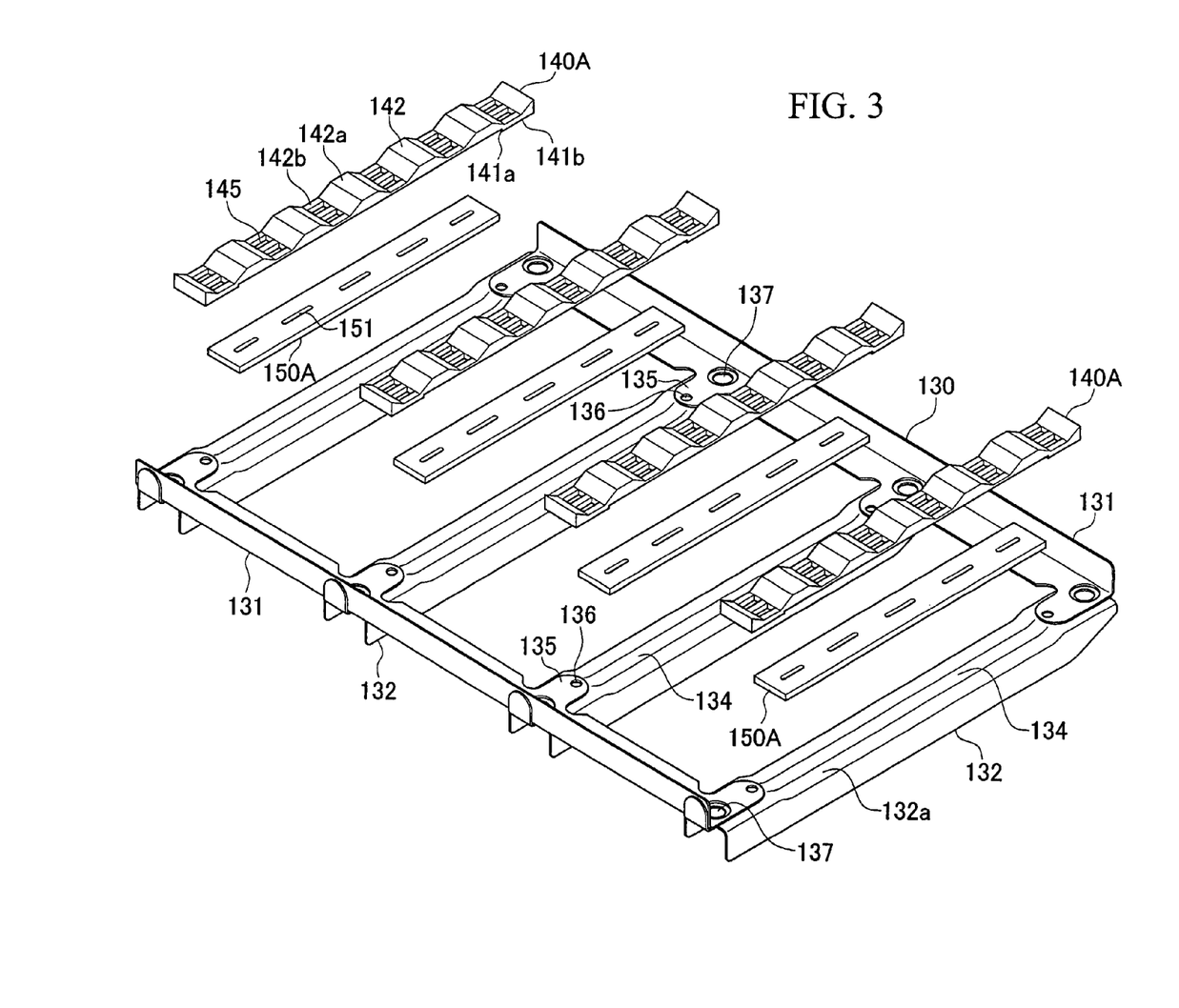
FIG. 3 is an exploded perspective view showing an upper frame, pushing members, and elastic bodies of the battery pack of the first embodiment, upside down.

FIG. 3 shows the upper frame 130 viewed from the back side (i.e., upside down). Each cross member 132 has a U-shaped section in which the upper side (i.e., the lower side in FIG. 3) is open, and the lower face of the cross member 132 includes a middle portion 132a which is recessed upward (i.e., downward in FIG. 3) in comparison with both ends, along the length of the cross member 132. The middle portion 132a includes a recessed portion 134 which is recessed upward (i.e., downward in FIG. 3) and is positioned at the center along the width of the middle portion 132a. In FIG. 3, the closing plates 133 are omitted.

Each main frame 131 has tongue or U-shaped engaging portions 135, each protruding inward along the length of the cross member 132 and being positioned under the corresponding cross members 132. Each engaging portion 135 has a pushing member fastening hole 136 which faces the recessed portion 134 of the cross member 132.

To the upper frame 130, pushing members 140A and elastic bodies 150A are attached, so as to hold the grommets 50, the bus-bar covers 94, and the caps 95 of the cell module units 90 arranged in the top row in the cell box 100. Each of the pushing members 140A and elastic bodies 150A has a width substantially the same as the width of the corresponding cross member 132, and is provided under the cross member 132.

Figure 4:
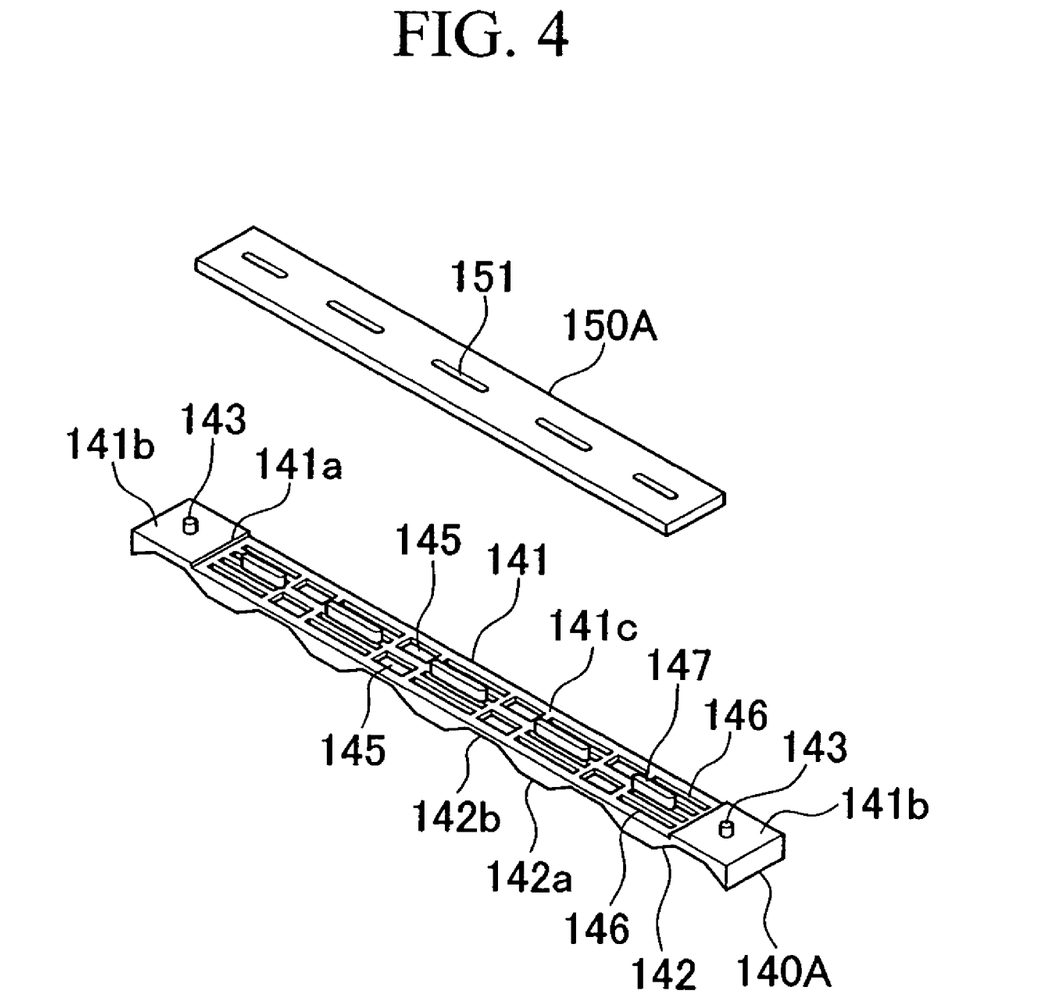
FIG. 4 is a perspective view of a pushing member and an elastic body in the first embodiment.

Each pushing member 140A is made of hard resin. As shown in FIG. 4, an upper face 141 of the pushing member 140A has step portions 141a at both ends along the length of the pushing member 140A, so that seating faces 141b at both ends are slightly higher than an elastic body attaching face 141c positioned at the center side (i.e., between the step portions 141a). Substantially at the center of each seating face 141b, a pushing member fastening protrusion 143 is provided. The elastic body attaching face 141c has a length substantially the same as that of the middle portion 132a.

Note that FIG. 3 shows the pushing members 140A upside down. A lower face 142 of each pushing member 140A has a waved shape in conformity with outer-peripheral faces of the relevant grommets 50, bus-bar covers 94, and caps 95, where a protruding portion 142a and a recessed portion 142b are alternately formed along the length of the pushing member 140A. When the pushing members 140A are disposed on the grommets 50, the bus-bar covers 94, and the caps 95 of the cell module units 90 arranged in the top row, these grommets 50, bus-bar covers 94, and caps 95 are fit to the corresponding recessed portions 142b, and the seating faces 141b of the upper faces 141 of the pushing members 140A and the upper faces of the holding portions 121 of the side frames 120 are substantially the same height (i.e., form a single plane).

In each recessed portion 142b, except for the recessed portions at both ends, a pair of through holes 145 is formed, which opens through the upper face 141. When the pushing members 140A are disposed on the grommets 50, the relevant fins 56 of the grommets 50 are respectively inserted into the corresponding through holes 145, so that the fins 56 and the pushing members 140A do not interfere with each other. In the elastic body attaching face 141c, (i) slits 146 (having bottoms, that is, whose bottom is not open) for accurately forming a face which contacts the corresponding grommet 50, and (ii) an elastic body fastening protruding portion 147 (i.e., a fittable protrusion) which protrudes upward and extends along the length of the pushing member 140A, are provided on the back side of each protruding portion 142a.

Each elastic body 150A is made of rubber or elastomer, and has a flat-plate shape. The length of the elastic body 150A is slightly smaller than that of the elastic body attaching face 141c of the upper face 141 of the pushing member 140A. The elastic body 150A has fittable holes 151 formed at regular intervals along the length of the elastic body 150A. Each fittable hole 151 is positioned at the center along the width of the elastic body 150A, and has an elongated shape. The elastic body fastening protrusions 147 of the pushing member 140A are respectively inserted into the corresponding fittable holes 151, thereby attaching the elastic body 150A to the elastic body attaching face 141c of the pushing member 140A. Instead, fastening protrusions may be provided on the elastic body 150A, and fittable holes to which the fastening protrusions can fit may be provided on the pushing member 140A, so as to fasten the elastic body 150A to the pushing member 140A.

Each pushing member 140A combined with the elastic body 150A is attached to the upper frame 130 by fitting and fastening the pushing member fastening protrusions 143 to the pushing member fastening holes 136 of the main frames 131. In a state in which the pushing members 140A are attached to the upper frame 130, the seating faces 141b of the pushing members 140A contact the corresponding engaging portions 135 of the main frames 131, and each elastic body 150A is tightly provided between the middle portion 132a of the corresponding cross member 132 and the elastic body attaching face 141c of the corresponding pushing member 140A.

As shown in FIG. 2, the upper frame 130 to which the pushing members 140A and the elastic bodies 150A are attached is lowered from an upper position toward the side frames 120 and the arranged cell module units 90, and the pushing members 140A are disposed on the grommets 50, the bus-bar covers 94, and the caps 95. Then bolts (not shown) are inserted into the corresponding upper frame fastening holes 137 of the upper frame 130, and screwed into the threaded holes 123 provided in the holding portions 121 of the side frames 120, thereby fastening the upper frame 130 to the holding portions 121 of the side frames 120.

Generally, when the cell module units 90 are stacked, heights of upper ends of the grommets 90, the bus-bar covers 94, and the caps 95 of the cell module units 90 in the top row may be slightly non-uniform, and a portion may have a slightly larger height than a predetermined height, due to a dimensional error in the grommets 90, the bus-bar covers 94, and the caps 95. However, in this battery pack 1, the pushing members 140A and the elastic bodies 150A are inserted between the upper frame 130 and the cell module units 90. Therefore, in the above-described process of attaching the upper frame 130, the elastic bodies 150A are elastically compressed and the pushing members 140A bend following the outer-peripheral faces of the grommets 50, the bus-bar covers 94, and the caps 95 of the cell module units 90 arranged in the top row. Therefore, it is possible to substantially uniformly apply force from the pushing members 140A to these grommets 50, bus-bar covers 94, and caps 95 and thus to uniformly push these elements downward. Therefore, a dimensional error due to stacking the cell module units 90 can be canceled by compression of the elastic bodies 150A, thereby pushing and holding the cell module units 90 (i.e., the cell modules 10) in the cell box 100 by the elastic bodies 150A via the pushing members 140A. As a result, it is possible to avoid an unstable state of the cell modules 10 in the cell box 100. The above structure is also effective when movement (i.e., vibration) of the vehicle is transferred to the battery pack 1.

Figure 6:
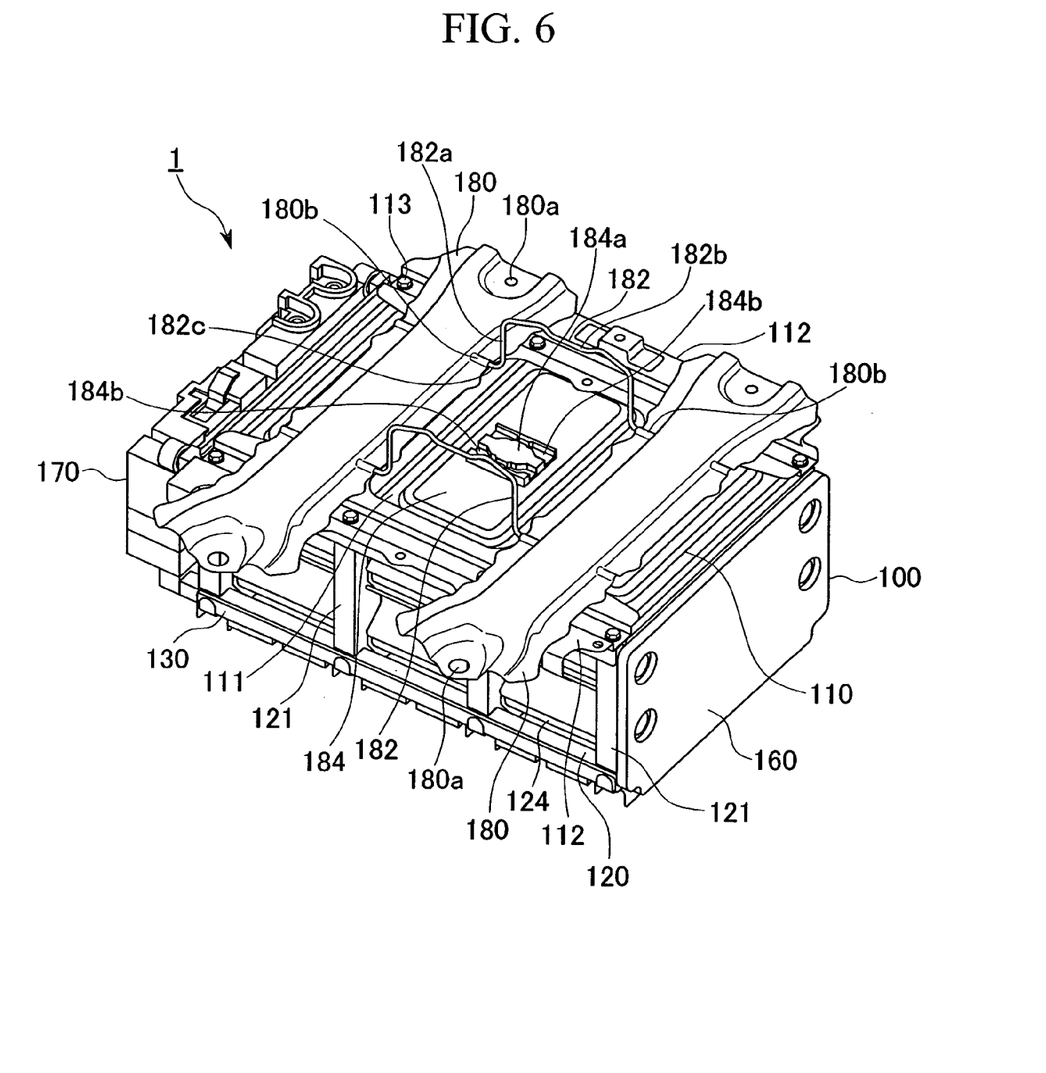
FIG. 6 is a perspective view showing the battery pack in a state in which transfer handles stand from a bottom plate in the first embodiment, upside down.
Figure 7:
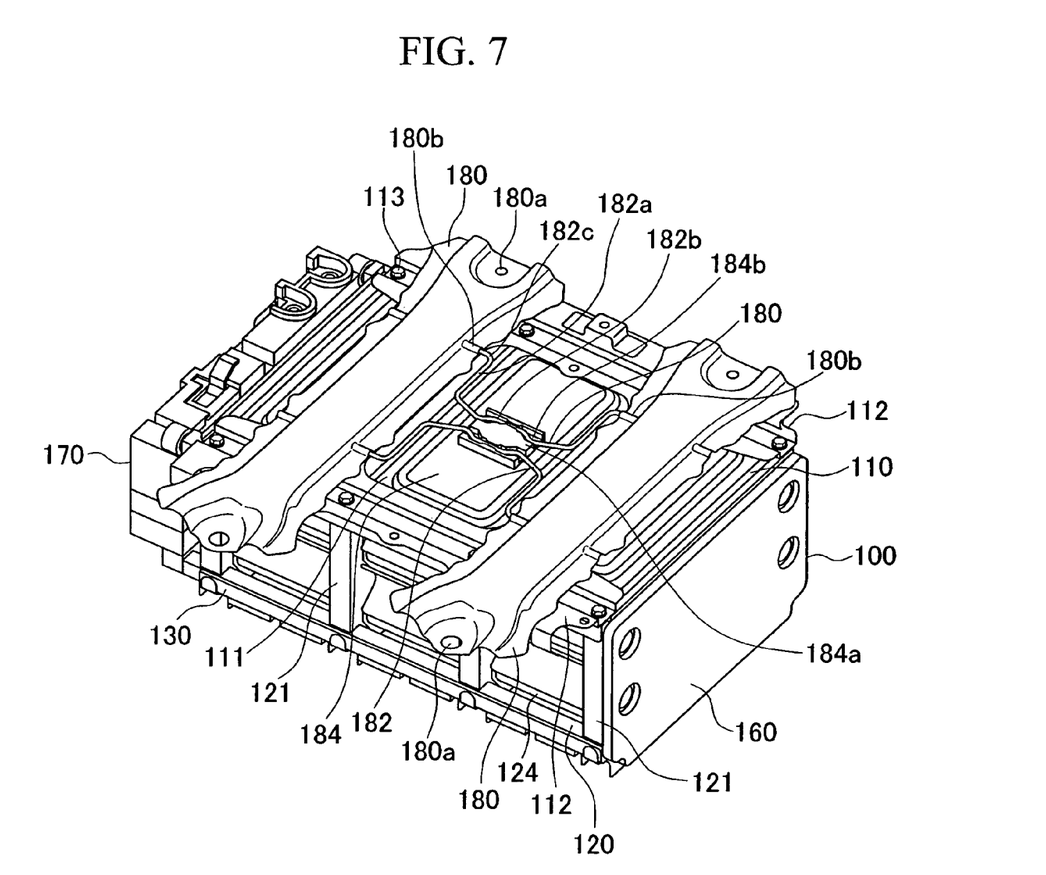
FIG. 7 is a perspective view showing the battery pack in a state in which the transfer handles are laid down in the first embodiment, upside down.

Additionally, as shown in FIGS. 6 and 7, to the lower frame 110 of the battery pack 1, transfer handles 182 are attached for convenience of transfer. FIGS. 6 and 7 are perspective views of the battery pack 1, which is viewed upside down. On the side opposite to the side where the end plate 160 is attached, a connection block 170 is fastened to the side frames 120. In order to serially connect all cell modules 10, the negative-electrode socket 92 and the positive-electrode socket 93 of relevant adjacent cell module units 90 are connected via the connection block 170.

A pair of fastening frames 180 spans the two sub frames 112 of the lower frame 110 of the cell box 100, where the fastening frames 180 are perpendicular to the sub frames 112 and are fastened to the sub frames 112 by welding. In plan view, each fastening frame 180 is positioned between the outermost holding portion 121 and the holding portion 121 adjacent thereto of each side frame 120. In each fastening frame 180, attachment holes 180a are provided at both ends along the length of the fastening frame 180. Bolts (not shown) are inserted into the attachment holes 180a and fastened to a vehicle frame (not shown) which is provided at the back face of a seat of the vehicle, thereby fastening the battery pack 1 to the back face of the seat.

The pair of the transfer handles 182 spans the fastening frames 180, where the transfer handles 182 are perpendicular to the fastening frames 180. Each transfer handle 182 is made by bending a round metal bar to form a U-shape, and includes a pair of rising portions 182a which are parallel to each other, a handle portion 182b which links upper ends of the rising portions 182a, and support portions 182c which respectively extend from lower ends of the rising portions 182a in opposite directions (i.e., extend away from each other). Each support portion 182c is tightly inserted in a rotatable form between the sub frame 112 and a recessed portion 180b formed in the relevant fastening frame 180, so that the position of each transfer handle 182 can be switched between a standing position (see FIG. 6) in which the transfer handle 182 stands from the bottom plate 111 of the lower frame 110 and a lying position (see FIG. 7) in which the transfer handle 182 and the bottom plate 111 are substantially parallel to each other. The transfer handles 182 have a dimension by which when both transfer handles 182 are made substantially parallel to the bottom plate 111, the transfer handles 182 are separated by a specific distance and do not overlap with each other.

In addition, to the bottom plate 111 of the lower frame 110, a handle holding member 184 made of foamable resin is fit and fastened, on an outer-face side of a portion between the fastening frames 180. The handle holding member 184 has a protruding portion 184a at the center thereof, and two fittable grooves 184b, which the handle portions 182b can be fit to or removed from, are formed side by side in the protruding portion 184a.

Regarding the transfer handles 182 having the above structure, when transferring the battery pack 1, the transfer handles 182 are set to the standing position, so that a transfer hook (not shown) can catch the handle portions 182b. Therefore, the battery pack 1 can be easily handled and also transferred very easily. In addition, in each of the following cases, (i) after the transfer is completed, (ii) while the battery pack 1 is stored, and (iii) after the battery pack 1 is attached to the back face of a seat of the vehicle, the transfer handles 182 are rotated and made to lie so as to be contained inside (i.e., between) the fastening frames 180, thereby fitting and fastening the handle portions 182b to the fittable grooves 184b of the handle holding member 184. Therefore, after the transfer is completed or the battery pack 1 is attached to the back face of a seat, the transfer handles 182 are not an obstacle. In addition, when the battery pack 1 is stored, the space necessary to store the battery pack 1 can be small. Furthermore, even when the vehicle runs, the transfer handles 182 do not move; thus, no odd sound is generated. The shapes, materials, or the like of the transfer handles 182 and the handle holding member 184 are not limited to those employed in this embodiment, and can be appropriately modified.

Second Embodiment

A second embodiment of the present invention will be explained with reference to FIGS. 8 and 9. In comparison with the battery pack 1 of the first embodiment, a battery pack 1000 of the second embodiment has distinctive features in the upper frame 130, pushing members 140B, and elastic bodies 150B. Other structural elements are identical to those of the first embodiment, and thus are given identical reference numerals or symbols, and explanations thereof are omitted.

In the battery pack 1 of the above-described first embodiment, the pushing members 140A and the elastic bodies 150A are attached to the upper frame 130 in advance. However, in the battery pack 1000 of the second embodiment, the elastic bodies 150B are attached to the upper frame 130 in advance, but the pushing members 140B are not attached to the upper frame 130 and are just disposed on the grommets 50, the bus-bar covers 94, and the caps 95 of the cell module units 90.

Figure 9:
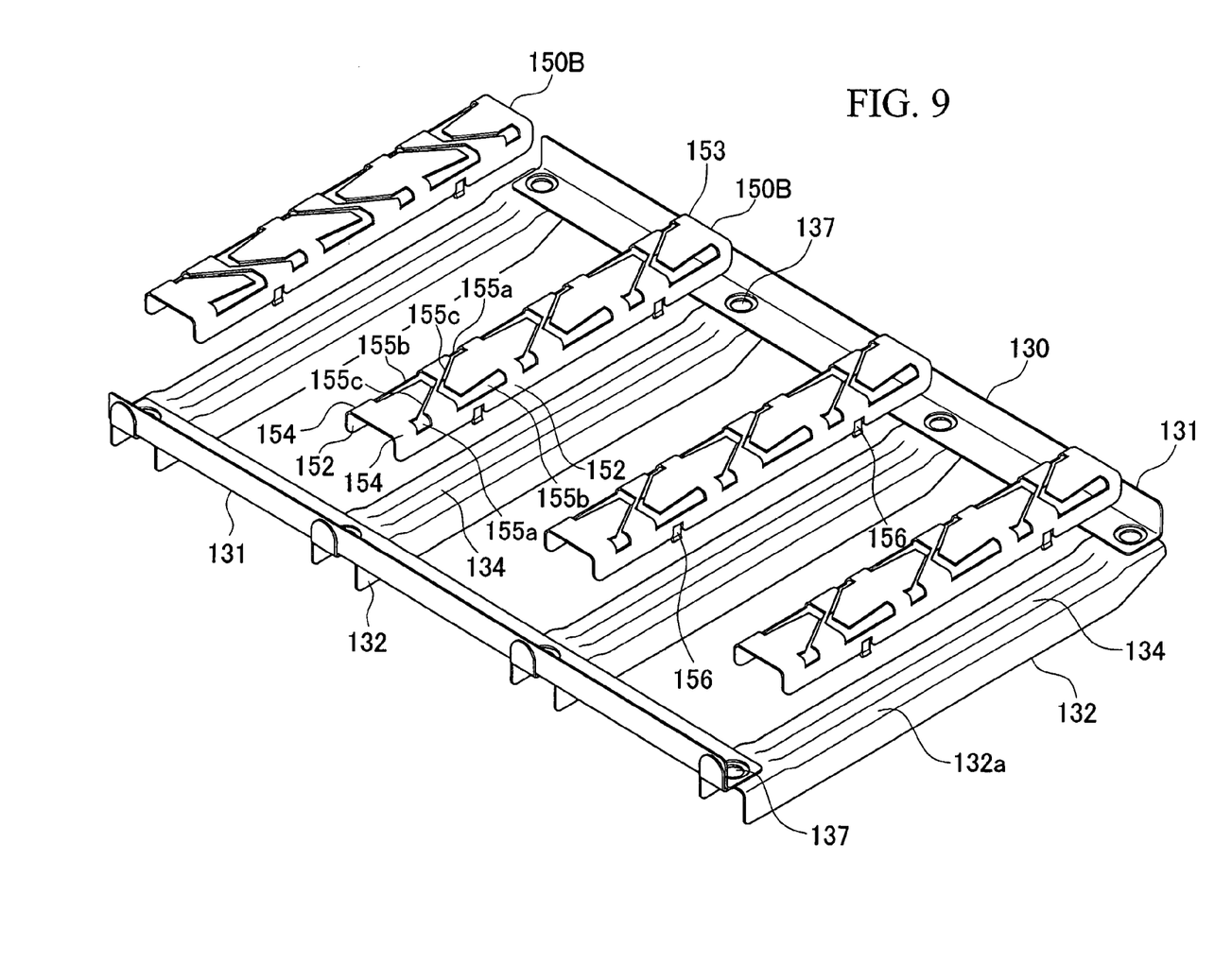
FIG. 9 is a perspective view showing an upper frame and elastic bodies of the battery pack of the second embodiment, upside down.

Due to the difference between both battery packs, as shown in FIG. 9, the main frames 131 of the upper frame 130 of the second embodiment have no engaging portions 135 (see FIG. 3) for fastening the pushing members 140B.

Figure 8:
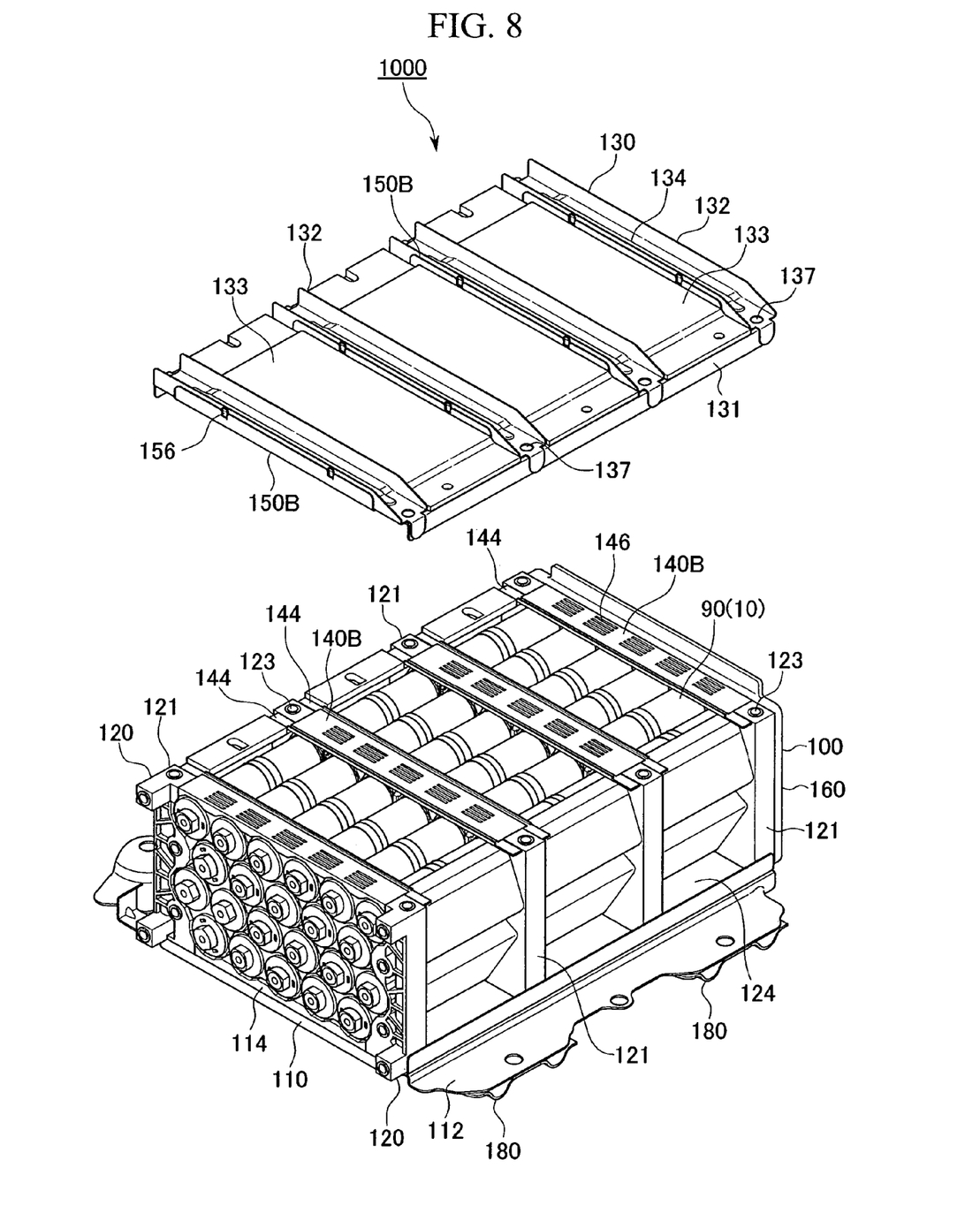
FIG. 8 is an exploded perspective view of a battery pack of a second embodiment in accordance with the present invention.

In addition, as shown in FIG. 8, each pushing member 140B of the second embodiment has arms 144 disposed on upper faces of portions (adjacent to the holding portions 121) of the side frames 120, where the arms 144 are provided at both ends along the length of the pushing member 140B. The shape of the lower face 142 of each pushing member 140B of the second embodiment is the same as that of the first embodiment. However, the upper face 141 of the pushing member 140B has no seating faces 141b or pushing member fastening protrusions 143 for attaching the pushing member 140B to the upper frame 130 and no elastic body fastening protrusions 147 for attaching the elastic bodies 150B to the pushing members 140B.

The structure of each elastic body 150B of the second embodiment completely differs from that of the elastic body 150A of the first embodiment. The elastic body 150B of the second embodiment is made using a plate spring obtained by press-processing a metal plate. FIG. 9 is an exploded perspective view showing a state before the elastic bodies 150B are attached to the upper frame 130, which is viewed upside down. Each elastic body 150B has a substantially U-shaped section. In each of corner portions 154 between standing walls 152 and a horizontal (wall) portion 153, substantially rectangular holes 155a and 155b, which have different lengths from each other, are formed at regular intervals. Between the corner portions 154, the short holes 155a and the long holes 155b face each other. In the horizontal portion 153, slits 155c, each linking the relevant short hole 155a and the relevant long hole 155b which face each other, are provided. Due to the holes 155a, the holes 155b, and the slits 155c, a specific spring function is applied to the elastic body 150B.

Each standing wall 152 has two hooks 156, each obtained by cutting two lines from the edge of the wall and bending a portion between the lines inward. The elastic body 150B has a width by which the cross member 132 can be inserted between the standing walls 152. When the elastic bodies 150B are pushed toward the corresponding cross members 132 from an upper position (see FIG. 9), the hooks 156 of both standing walls 152 of each elastic body 150B push the relevant cross member 132 from both sides thereof. Due to this pushing of the hooks 156, the elastic body 150B can be fastened to the relevant cross member 132.

In the battery pack 1000 of the second embodiment, as discussed above, before the upper frame 130 is attached to the side frames 120, the pushing members 140B are disposed onto the grommets 50, the bus-bar covers 94, and the caps 95 of the cell module units 90 arranged in the top row, and the upper frame 130 is further disposed on the pushing members 140B and fastened to the side frames 120.

Also in accordance with the battery pack 1000 of the second embodiment, the pushing members 140B and the elastic bodies 150B are inserted between the upper frame 130 and the cell module units 90. Therefore, in the process of attaching the upper frame 130, the elastic bodies 150B are elastically compressed and the pushing members 140B bend following outer-peripheral faces of the grommets 50, the bus-bar covers 94, and the caps 95 of the cell module units 90 arranged in the top row. Therefore, it is possible to substantially uniformly apply force from the pushing members 140B to these grommets 50, bus-bar covers 94, and caps 95 and thus to uniformly push these elements downward. Therefore, a dimensional error due to stacking of the cell module units 90 can be canceled by compression of the elastic bodies 150B, thereby pushing and holding the cell module units 90 (i.e., the cell modules 10) in the cell box 100 by the elastic bodies 150B via the pushing members 140B. As a result, it is possible to avoid an unstable state of the cell modules 10 in the cell box 100, and thus the battery pack 1000 is not shaken due to the movement (i.e., vibration) of the vehicle.

Other Embodiments

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the aforementioned embodiments, each grommet 50 is provided for coupling two cell modules 10. However, a grommet attached to each cell module 10 may be employed. In addition, in the aforementioned embodiments, each grommet 50 has a shape which can be divided into two portions. However, each grommet 50 may be an integral body which cannot be divided.

What is claimed is:

1. A battery pack, comprising:
   a plurality of cylindrical cell modules, each formed by serially connecting a plurality of unit cells;
   a cell box in which the cell modules are contained in a manner such that the cell modules are arranged parallel to each other;
   a plurality of holding members fit to outer peripheries of the cell modules so as to arrange the cell modules in a zigzag manner along axes of the cell modules, in a manner such that the holding members make contact with each other and a gap is secured between every adjacent cell module; and
   an elastic body inserted between the holding members and a frame of the cell box, wherein the elastic body is elastically compressed and pushes the holding member fit to each of the cell modules which face the elastic body,
   wherein the elastic body is made using a metal plate spring, and has hooks to secure the elastic body to the frame.

2. A battery pack, comprising:
   a plurality of cylindrical cell modules, each formed by serially connecting a plurality of unit cells;
   a cell box in which the cell modules are contained in a manner such that the cell modules are arranged parallel to each other;
   a plurality of holding members fit to outer peripheries of the cell modules so as to arrange the cell modules in a zigzag manner along axes of the cell modules, in a manner such that the holding members make contact with each other and a gap is secured between every adjacent cell module; and
   an elastic body inserted between the holding members and a frame of the cell box,
   wherein the elastic body is made using a metal plate spring, and has hooks to secure the elastic body to the frame,
   wherein the elastic body has a substantially U-shaped section consisting of a horizontal portion and standing walls extending upward from both ends of the horizontal portion along a width thereof;
   holes are formed in both corner portions between the horizontal portion and the standing walls; and
   slits for connecting the holes at both corner portions are formed in the horizontal portion.

* * * * *